United States Patent Office 3,161,656
Patented Dec. 15, 1964

---

3,161,656
UNSATURATED β-LACTONES AND METHOD OF PREPARING THEM
Edward U. Elam, Kingsport, Tenn., assignor to Eastman Kodak Company, Rochester, N.Y., a corporation of New Jersey
No Drawing. Filed May 9, 1961, Ser. No. 108,740
10 Claims. (Cl. 260—343.9)

This invention relates to novel unsaturated β-lactones and to a novel method of preparation. More particularly, it relates 2,2,4,4-tetraalkyl-3-hydroxy-3-butenoic acid β-lactones and to their preparation by pyrolysis of dialkyl ketene polymers.

The compounds of the invention are represented by the following structural formula:

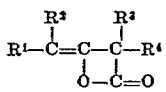

wherein $R^1$, $R^2$, $R^3$ and $R^4$ are alkyl radicals of from 1 to 4 carbon atoms. The pair of substituents $R^1$ and $R^2$ and the pair of substituents $R^3$ and $R^4$ can also be alkylene groups which, with the carbon atom to which they are attached, form a 5 or 6 membered saturated carbocyclic ring. In accordance with my invention, these compounds are prepared by polymerizing a dialkyl ketene in the presence of a strongly basic catalyst. The resulting solid linear polymer is then decomposed by pyrolysis to obtain the novel lactones.

The lactones of my invention are valuable intermediates in the preparation of a number of useful chemicals. For example, when contacted with a strongly basic catalyst such as sodium methoxide in boiling ether or benzene, they form useful crystalline polymers. These polymers, though having the same infrared spectrum as the dialkyl ketene polymers from which the lactones are produced, have significant advantages over such polymers. For instance, the polymer made from the lactone does not evolve objectionable amounts of the monomeric ketene when heated.

The novel lactones are also useful as intermediates in the preparation of valuable allenic compounds. For instance, tetramethyl allene is produced in good yield by pyrolysis of 2,2,4-trimethyl-3-hydroxy-3-pentenoic acid β-lactone at a temperature, e.g., of 450° C.

As chemical reagents or intermediates the lactones of my invention have important advantages over the previously known dialkyl ketene dimers, i.e. the tetraalkyl-1,3-cyclobutanediones. For example, while tetramethyl-1,3-cylcobutanedione is a volatile, easily sublimed solid, the isomeric lactone is a liquid at normal temperature and pressure and is, therefore, much more convenient to employ as a reagent. The two types of compounds can also be distinguished in their chemical reactions. In some reactions they give identical products but in others the products are quite different. Furthermore, the unsaturated β-lactones of the invention react with some compounds toward which the isomeric tetraalkylcyclobutanediones are completely inert.

The lactones of my invention are dimers of dialkyl ketenes but their properties are surprisingly different from those of such β-lactone dimers as diketene and the dimers of monoalkyl ketenes. My compounds are sufficiently reactive for synthetic work but are much more stable than diketene and are less dangerous to handle and less susceptible to deterioration in storage. Diketene readily polymerizes on standing at room temperature while my compounds can be stored at normal temperature for long periods without polymerizing. When diketene is reacted in an inert solvent which contains a small amount of catalyst (such as sodium ethylate) at 70–120° C., dehydroacetic acid is obtained in yields of 60–80% [A. B. Boese, Jr., Ind. Eng. Chem. 32, 21 (1940)]. The 2,2,4,4-tetraalkyl-3-hydroxy-3-butenoic acid β-lactones, on the other hand, give only polymer under similar conditions. No compounds analogous to dehydroacetic acid are formed.

As I have indicated, the method of the present invention is essentially a two-stage method. In the first stage the dialkyl ketene starting material is polymerized under the influence of a strongly basic catalyst to form a solid linear polymer. In the second stage this polymer is decomposed by pyrolysis to produce the β-lactone dimer of the dialkyl ketene.

The starting materials for producing lactones of the formula,

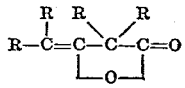

by the method of my invention are disubstituted ketenes of the structure,

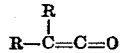

wherein the substituents, R, are alkyl groups of 1 to 4 carbon atoms or are alkylene groups which, with the carbon atom to which they are attached, form a 5 or 6 membered saturated carbocyclic ring. Examples include dimethylketene, ethylmethylketene, diethylketene, butylethylketene, di-n-propylketene, diisobutylketene, di-n-butylketene and carbocyclic ketenes such as tetramethyleneketene and pentamethyleneketene. I use the term dialkylketene to designate all of such disubstituted ketenes. The starting material can be one of such disubstituted ketenes or a mixture of two or more. In the latter event the lactone product can have any possible combination of four substituents of the types mentioned.

The polymerization stage of the process can be carried out over a wide range of conditions. For convenience and safety, it is preferable to prepare the polymer at or near room temperature, although much lower or higher temperature can be used. The polymerization is highly exothermic so it is convenient to use a solvent or liquid reaction medium having a boiling point near the temperature at which the polymerization is to be carried out and to control the reaction temperature by refluxing the liquid. Ethyl ether is a particularly convenient reaction medium but other liquids such as dioxane, benzene, diisopropyl ether, hexane and the like can be used.

The degree to which the dialkyl ketene monomer is polymerized in the polymerization stage can vary considerably. The intermediate polymer must be of sufficient chain length to be readily decomposable upon pyrolysis. However, extremely long chain length or high molecular weight is unnecessary. In general, satisfactory results are obtained by polymerizing the monomer sufficiently to obtain a linear polymer having an average chain length of about 10 to 200 units.

The polymerization of the dialkyl ketene monomer is carried out in the presence of a catalyst. Suitable catalysts are strongly basic materials. Best results are obtained with alcoholates or alkoxides of titanium or of elements of Groups I, II or III of the periodic table, such as sodium, potassium, lithium, calcium, aluminum or titanium ethoxide, propoxide, butoxide, etc. These are the preferred polymerization catalysts. Other suitable catalysts include: other strongly basic substances whose 0.1 N aqueous solutions have a pH of at least 12, such as alkali metal hydroxides; calcium hydroxide; metal alkyls of titanium or of elements of Groups I, II or III of the periodic table, such as triethyl aluminum, amyl sodium or diethyl zinc; quaternary ammonium hydroxides such as trimethylbenzylammonium hydroxide and the like.

For catalyzing the polymerization reaction only a minor catalytic amount of the basic substance is required, and this is considerably less than one mol of catalyst per mol of dialkyl ketene. The amount of catalyst can vary somewhat depending on the polymerization temperature and other factors. Less catalyst is required for higher temperatures and more for lower temperatures. In general, about 0.1 to 10 weight percent of catalyst based on the polymeric product gives satisfactory results.

The polymer obtained in the polymerization stage is subsequently decomposed by pyrolysis. The polymer is heated to a temperature sufficiently high to yield the $\beta$-lactone dimer as a vapor product but not so high as to decompose the lactone. The temperature at which the polymer decomposes to the $\beta$-lactone dimer depends, at least in part, upon its molecular weight. The lower molecular weight, ether-soluble polymers decompose to some extent in the range of 150–200° C. The higher molecular weight, ether-insoluble polymers melt at around 200° C. and decompose at about 280° C. To avoid decomposing the desired $\beta$-lactone product, pyrolysis temperature should not exceed about 300° C.

The examples hereinafter illustrate preparation of my novel lactones and provide comparisons with other compounds.

Example 1

Dimethyl ketene, prepared by the pyrolysis of isobutyric anhydride, was passed into a stirred suspension of 5 g. of sodium methylate in 1500 ml. of ethyl ether. The solution began to reflux vigorously within a few minutes, and a white, powdery solid began to separate. The mixture was allowed to stand overnight at room temperature; the yellow color of dimethyl ketene disappeared, and a large amount of white solid separated from the mixture. The polymer (252 g.) was recovered by filtration, washed thoroughly with water, and air-dried. It melted sharply at 175° C. *Analysis.*—Calcd. for $(C_4H_6O)_x$: C, 68.6; H, 8.56. Found: C, 68.9; H, 8.81; mol. wt., 2640. 100 g. of this polymer was decomposed by distillation through a short distilling column at 100 mm. pressure. The polymer melted to a viscous liquid which decomposed smoothly, starting at about 20° C. Distillate was collected up to a head temperature of 150° C. (100 mm.) The distillate, which weighed 81 g., was redistilled through the same column to give 63.0 g. of 2,2,4-trimethyl-3-pentenoic acid $\beta$-lactone boiling from 105–10° C. at 100 mm. This material was 97.2% pure by gas chromatography. The structure was proved by the infrared and nuclear magnetic resonance spectra, as well as by its reaction with amines to give amides of 2,2,4-trimethyl-3-oxovaleric acid. *Analysis.*—Calcd. for $C_8H_{12}O_2$: C, 68.6; H, 8.56; mol. wt., 140. Found: C, 68.4; H, 8.53; mol. wt., 127. More 2,2,4-trimethyl-3-pentenoic acid $\beta$-lactone was recovered by distillation of the mother liquor from filtration of the original dimethyl ketene polymer. This material appears to have been present as an ether-soluble polymer of very low molecular weight.

The next example demonstrates a reaction in which the lactones of the invention yield a product different from that of the isomeric tetraalkylcyclobutanediones. U.S. Patent 2,936,324 discloses that hydrogenation of such diones produces tetraalkyl-cyclobutanediols. Example 2 below demonstrates that an aliphatic acid is obtained by hydrogenation of the unsaturated $\beta$-lactones of the invention.

Example 2

140 g. (1 mole) of 2,2,4-trimethyl-3-hydroxy-3-pentenoic acid $\beta$-lactone was hydrogenated for six hours over 10 g. of 5% palladium on alumina at 100° C., 3000 p.s.i. Gas chromatographic analysis of the product indicated that it consisted essentially of 3-hydroxy-2,2,4-trimethyl-valeric acid $\beta$-lactone and 2,2,4-trimethylvaleric acid in the ratio 1:4.1 (area percent). The filtered reaction mixture was distilled through a short packed column to give, after removal of a small amount of low-boilers, 14.5 g. of 3-hydroxy-2,2,4-trimethyl-valeric acid $\beta$-lactone, B.P. 75–82° C. (9 mm.), $n_D^{20}$ 1.4230, and 69.7 g. of 2,2,4-trimethylvaleric acid, B.P. 107–10° C. (9 mm.), $n_D^{20}$ 1.4240. The distillation residue weighed 4.5 g.

The next example illustrates the reaction of 2,2,4-trimethyl-3-hydroxy-3-pentenoic acid $\beta$-lactone with an aromatic amine.

Example 3

A mixture of 93.1 g. (1 mole) of aniline and 140 g. (1 mole) of 2,2,4-trimethyl-3-hydroxy-3-pentenoic acid $\beta$-lactone was heated on a steam bath for three hours, then allowed to stand at room temperature overnight. The product solidified completely; after one recrystallization from diisopropyl ether, pure 2,2,4-trimethyl-3-oxovaleranilide, M.P. 93.5–94.5° C., was obtained in 93% yield. The melting point of the product was not changed by further recrystallization.

The following example illustrates the failure of tetramethyl-1,3-cyclobutanedione to react with aniline under conditions similar to those of Example 3.

Example 4

A solution of 140 g. (1 mole) of tetramethyl-1,3-cyclobutanedione and 232.5 g. (2.5 moles) of aniline in 300 ml. of xylene was refluxed for two days. Unchanged tetramethyl-1,3-cyclobutanedione was recovered in essentially quantitative yield on distillation of the reaction mixture.

Example 5 below illustrates the polymerization of 2,2,4-trimethyl-3-hydroxy-3-pentenoic acid $\beta$-lactone in the presence of base.

Example 5

5 g. of sodium methoxide was added to a solution of 100 ml. of 2,2,4-trimethyl-3-hydroxy-3-pentenoic acid $\beta$-lactone in 100 ml. of toluene. An exothermic reaction took place; after it had subsided, the mixture was refluxed for 2¼ hours, then allowed to cool. The mixture became semisolid; on filtering, 80.4 g. of a low-molecular-weight polymer which melted at about 170° C. was obtained. The intrinsic viscosity of this polymer, measured in phenol-tetrachloroethane, was 0.09.

Example 6 below demonstrates the preparation of an unsaturated $\beta$-lactone of the invention from a dialkyl ketene of which the alkyl groups are not identical.

Example 6

50 g. of ethylmethylketene was polymerized as described in Example 1. The resulting polymer was ether-soluble. Evaporation of the ether solution, after filtering off the sodium methoxide, gave a syrupy polymer which was pyrolyzed by distillation at 100 mm. to give a crude fraction boiling from 110–195° C. (100 mm.) which was shown by gas chromatography and infrared analysis to consist mainly of 2,4-dimethyl-2-ethyl-3-hydroxy-3-hexenoic acid $\beta$-lactone.

Example 7 below demonstrates the preparation of an unsaturated $\beta$-lactone of the invention from diethylketene.

Example 7

A solution of 10 ml. of diethylketene in 20 ml. of dry toluene was kept under a nitrogen atmosphere, cooled to −75° C., and treated with 0.108 g. of butyl lithium. A polymer was obtained which, on pyrolysis, gave 3-hydroxy-2,2,4-triethyl-3-hexenoic acid $\beta$-lactone, B.P. 120–30° C. (25 mm.).

Although the invention has been described in considerable detail with reference to certain preferred embodiments thereof, it will be understood that variations and modifications can be effected within the spirit and scope of the invention as described herein above and as defined in the appended claims.

I claim:
1. An unsaturated β-lactone of the formula

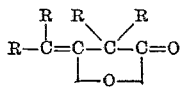

wherein the substituents, R, taken singly, are unsubstituted alkyl groups of 1 to 4 carbon atoms and, taken collectively, are unsubstituted alkylene groups which, with the carbon atom to which they are attached, form a saturated carbocyclic ring of 5 to 6 carbon atoms.

2. A 2,2,4,4-tetraalkyl-3-hydroxy-3-butenoic acid β-lactone wherein the alkyl groups are unsubstituted and have from 1 to 4 carbon atoms.

3. 2,2,4,4-tetramethyl-3-hydroxy-3-butenoic acid β-lactone.

4. 2,4 - dimethyl-2-ethyl-3-hydroxy-3-hexenoic acid β-lactone.

5. 3-hydroxy-2,2,4-triethyl-3-hexenoic acid β-lactone.

6. The method of preparing 2,2,4,4-tetraalkyl-3-hydroxy-3-butenoic acid β-lactones which comprises contacting a dialkyl ketene of which the alkyl substituents have from 1 to 4 carbon atoms with a strongly basic polymerization catalyst under polymerization conditions, recovering a solid polymer, decomposing said polymer by pyrolysis and recovering a product comprising such lactone.

7. The method of preparing 2,2,4,4 - tetraalkyl-3-hydroxy-3-butenoic acid β-lactones which comprises contacting a dialkyl ketene of which the alkyl substituents have from 1 to 4 carbon atoms with an alkali metal alkoxide catalyst under polymerization conditions and in the presence of a volatile liquid reaction medium, separating a solid polymer from the liquid reaction medium, heating the polymer to pyrolysis temperature and recovering a distillate product comprising said 2,2,4,4-tetraalkyl-3-hydroxy-3-butenoic acid β-lactone.

8. The method of preparing 2,2,4 - trimethyl-3-hydroxy-3-pentenoic acid β-lactone which comprises forming a reaction mixture of dimethyl ketene with a suspension of a catalytic amount of sodium methylate in ethyl ether at room temperature, maintaining the reaction mixture at the boiling temperature of the ether at atmospheric pressure, recovering a solid polymer from the reaction mixture, heating the polymer to pyrolysis temperature and recovering the evolved vapor comprising 2,2,4-trimethyl-3-hydroxy-3-pentenoic acid β-lactone.

9. The method of preparing 2,4-dimethyl-2-ethyl-3-hydroxy-3-hexenoic acid β-lactone which comprises forming a reaction mixture of ethylmethylketene with a suspension of a catalytic amount of sodium methylate in ethyl ether at room temperature, maintaining the reaction mixture at the boiling temperature of the ether at atmospheric pressure, separating a viscous polymer from the reaction mixture, heating the polymer to pyrolysis temperature and recovering a product comprising 2,4-dimethyl-2-ethyl-3-hydroxy-3-hexenoic acid β-lactone.

10. The method of preparing 3-hydroxy-2,2,4-triethyl-3-hexenoic acid β-lactone which comprises forming a reaction mixture of diethyl ketene, toluene and butyl lithium in an inert atmosphere at a temperature of about −75° C., recovering a viscous polymer, decomposing said polymer by pyrolysis and recovering a product comprising 3-hydroxy-2,2,4-triethyl-3-hexenoic acid β-lactone.

References Cited in the file of this patent
UNITED STATES PATENTS

| 2,675,392 | Theobald | Apr. 13, 1954 |
| 3,004,070 | Hartle | Oct. 10, 1961 |

OTHER REFERENCES

Karrer: Organic Chem., Elsevier Pub. Co., New York, 2nd Eng. ed. (1946), pages 170 and 171.

Noller: Chem. of Org. Compounds, Saunders Co., Philadelphia, Pa., 2nd ed. (1957), page 762.